March 27, 1962 K. J. BRAUN ETAL 3,027,071

RECORD ANALYZING APPARATUS

Filed Dec. 26, 1958 8 Sheets-Sheet 1

Inventor
Karl J. Braun
Robert W. Churchill
By their Attorney
Vincent A. White

March 27, 1962 K. J. BRAUN ETAL 3,027,071

RECORD ANALYZING APPARATUS

Filed Dec. 26, 1958 8 Sheets-Sheet 2

March 27, 1962 K. J. BRAUN ET AL 3,027,071

RECORD ANALYZING APPARATUS

Filed Dec. 26, 1958 8 Sheets-Sheet 5

RECORD ANALYZING APPARATUS 3,027,071

RECORD ANALYZING APPARATUS

Karl J. Braun, Springdale, and Robert W. Churchill, Huntington, Conn., assignors to A. Kimball Company, Brooklyn, N.Y., a corporation of New York Filed Dec. 26, 1958, Ser. No. 783,038
10 Claims. (Cl. 235—61.11)

This invention relates to record analyzing apparatus. More particularly the invention is related to means for detecting certain errors or malfunctions in decoding mechanisms embodied in such apparatus.

The preferred embodiment of the invention is illustrated as applied to a record analyzing apparatus such as disclosed in an application for United States Letters Patent Serial No. 760,449, filed September 11, 1958, in the names of Braun and Cetran. As therein disclosed, a plurality of decoding units are actuated in accordance with coded data indications sensed from a record to convert the coded data by selection of one of a plurality of possible electrical circuits indicative of the value of the coded data.

Only one circuit is formed in each decoding unit corresponding to valid code designations in the record. For invalid combinations of code designations no circuit is selected. Thus any decoding unit not having a complete circuit indicates a code error in the record or malfunction of the apparatus. Since the usefulness of coded statistical records and of apparatus for analyzing them depends largely on accuracy of both, it is essential that some means be provided for detecting errors in both record and analyzing apparatus.

Accordingly, it is an object of the present invention to provide means to test each decoding unit for the presence or absence of a valid circuit. To this end means are provided for electrically connecting all units in series so that in the event that each unit has a valid circuit formed therethrough then a single series testing circuit is closed through all units. In the event that any unit does not have a circuit formed therein due to code error or malfunction then said series circuit will be open. By connecting the terminals of said series circuit to a suitable indicating device or devices the presence or absence of error can be indicated. In the present embodiment of the invention, presence of an error in decoding is indicated by the lighting of an error lamp and by such control of the analyzing apparatus as to prevent further operation of the apparatus without operator intervention. In the absence of error in decoding (i.e. the presence of a complete circuit in each decoding unit) neither of the above events occur and the control of the apparatus is conditioned for automatically analyzing another record.

According to another object of the invention, the connecting means are effective to connect all units in series only when the sensing of the record is taking place and is ineffective when the apparatus is carrying out its control function on a secondary device. Since the decoding units of the present embodiment operate to decode the sensed data designations by relative displacement of a plurality of slides, it is essential that such displacement be preserved during both the error checking and the control functions of the apparatus. To this end each decoding unit is provided with means for locking associated slides in their relatively displaced condition as soon as the sensing operation is completed. Thus when the sensing means is retracted from the record, the slides are moved bodily to their control position while their relative decoding displacement is maintained. The connecting means is so designated that during the initial displacement of the decoding slides one terminal of the decoding circuit formed is connected to the connecting means. However, when the slides are moved bodily from their sensing position to their control position this terminal is disconnected from the connecting means and is connected to a terminal bar corresponding to the decoded value of the data sensed from the record.

The above and other features of the invention including various novel details of construction and combinations of parts will now be more particularly described and thereafter pointed out in the claims.

Figures 1, 2, 3:
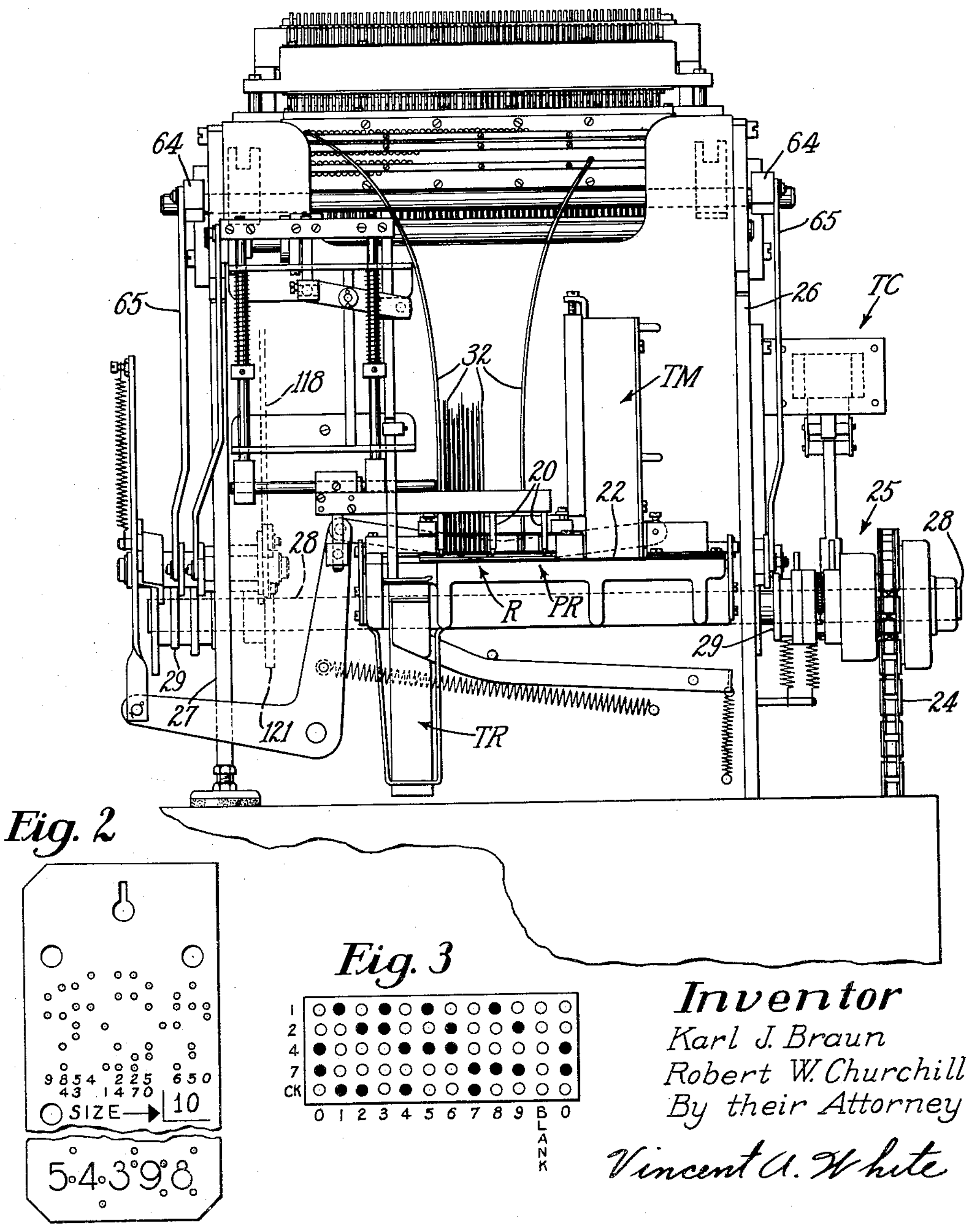
FIG. 1 is a front elevation of a record analyzing apparatus embodying the present invention.
FIG. 2 illustrates a typical perforated merchandise tag to be analyzed.
Figure 4:
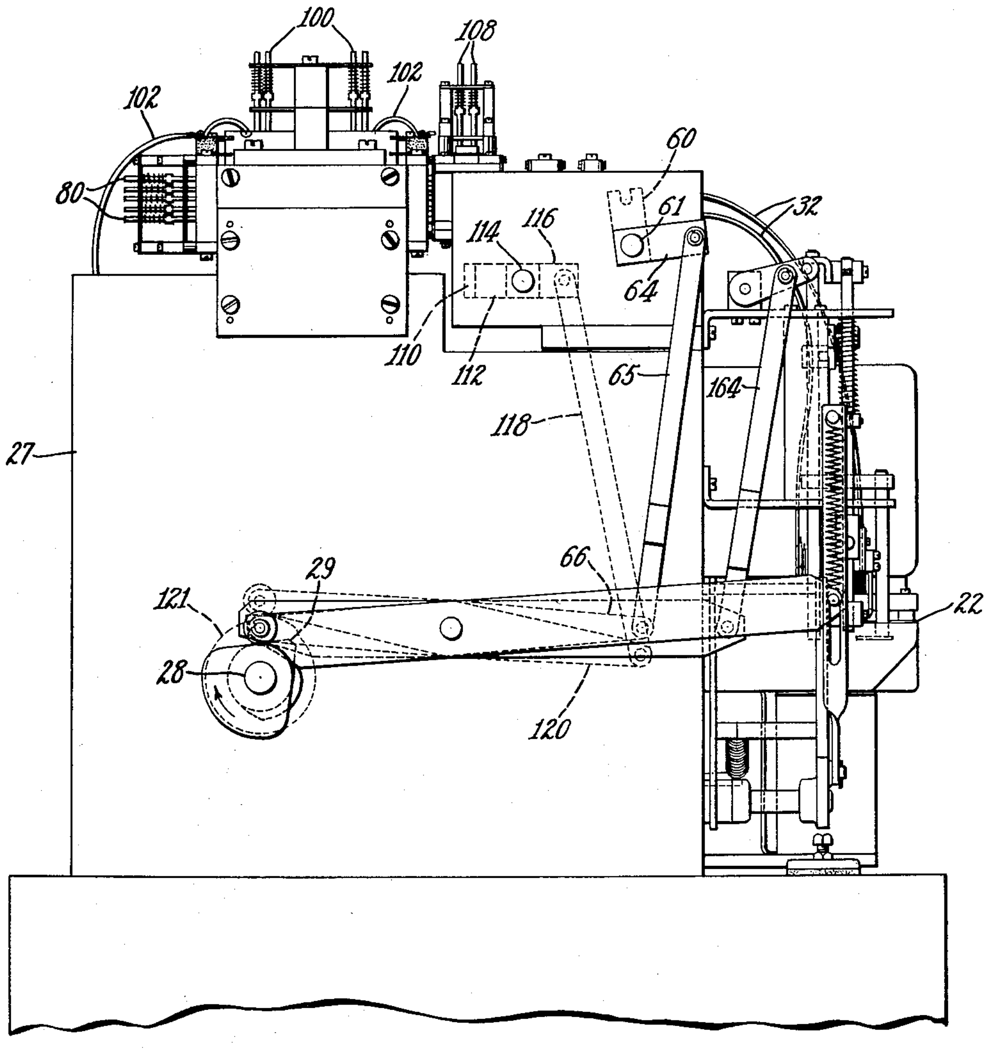
Figure 5:
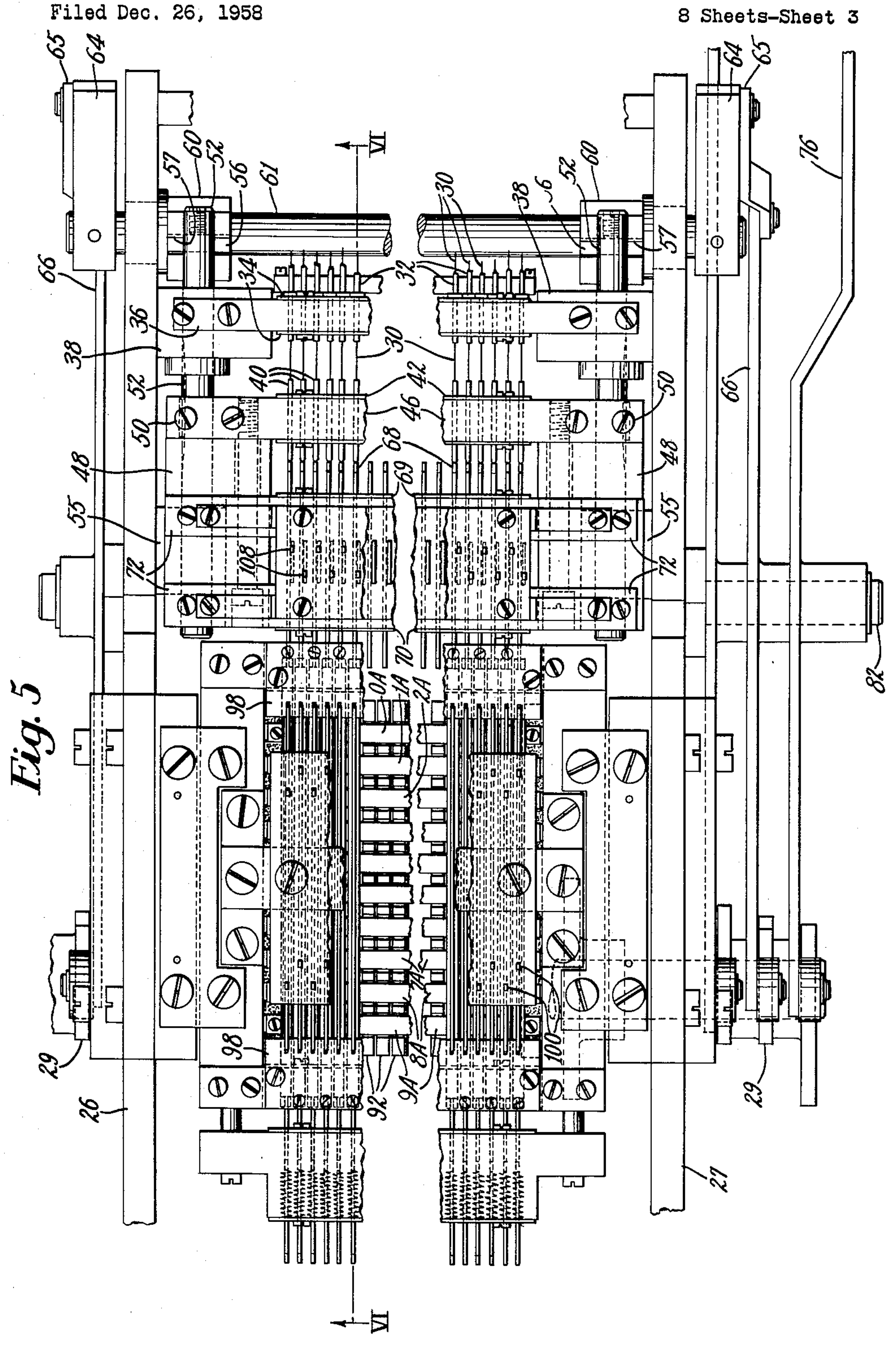
Figure 6:
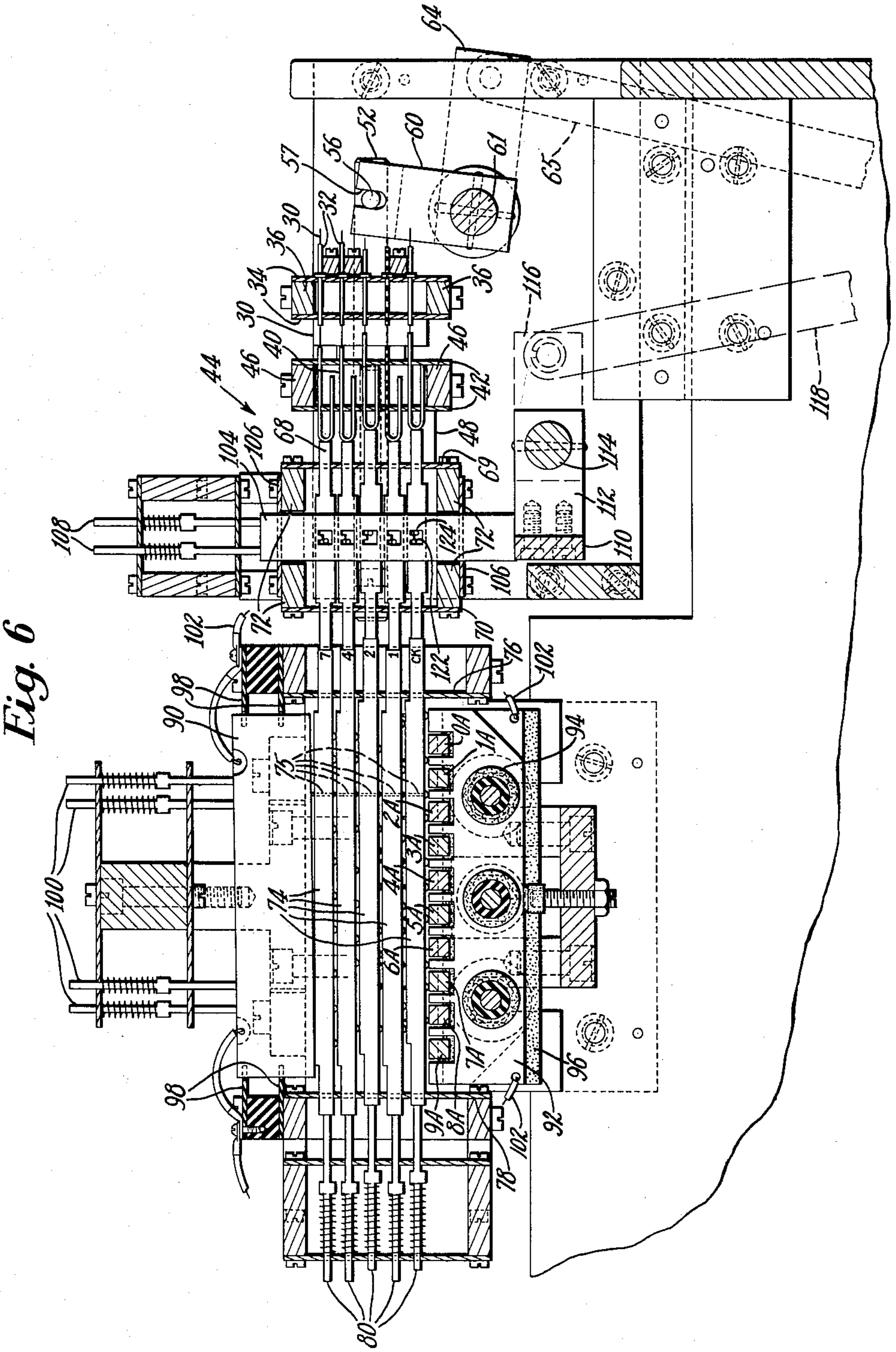
Figure 7:
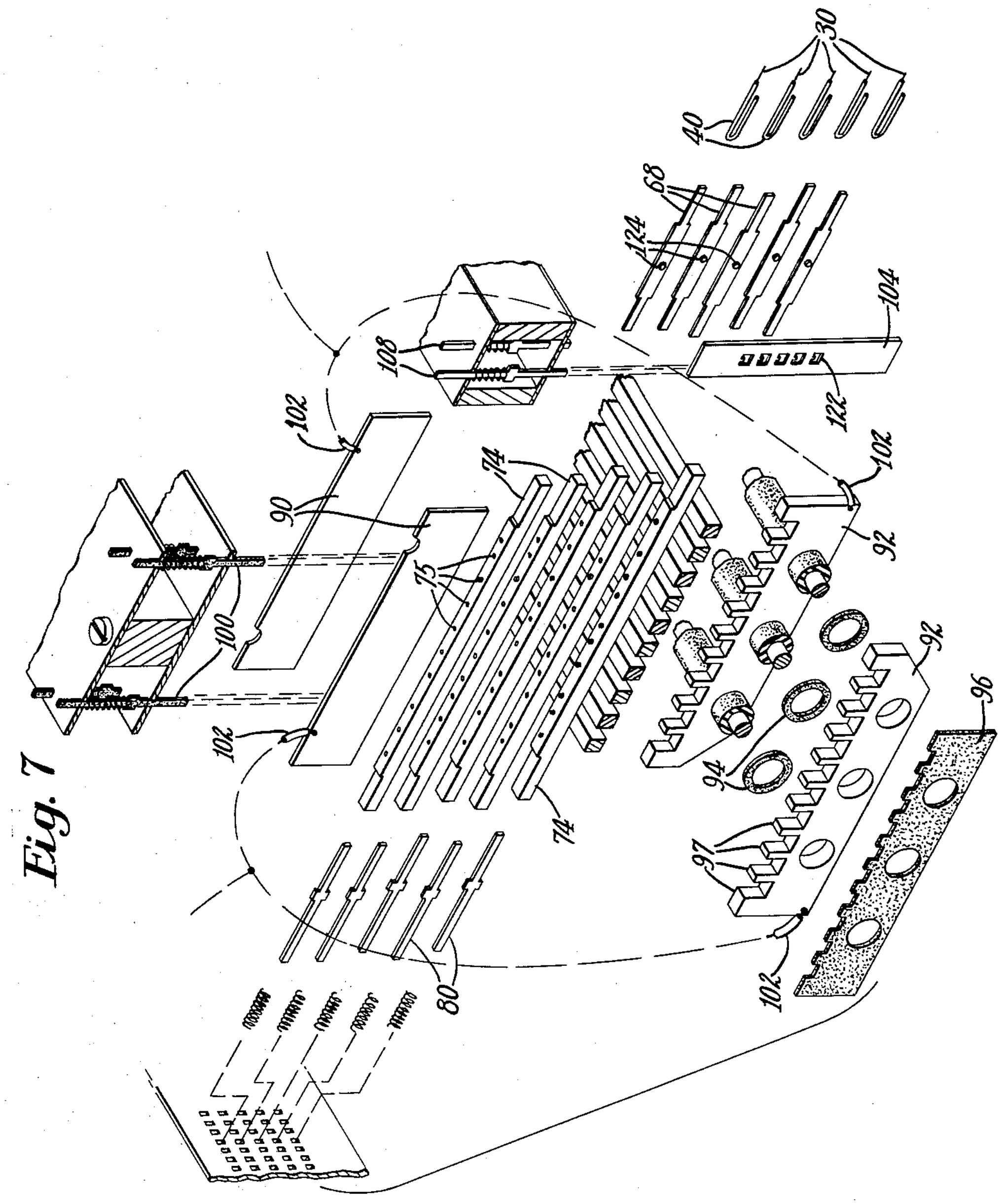
Figure 8:
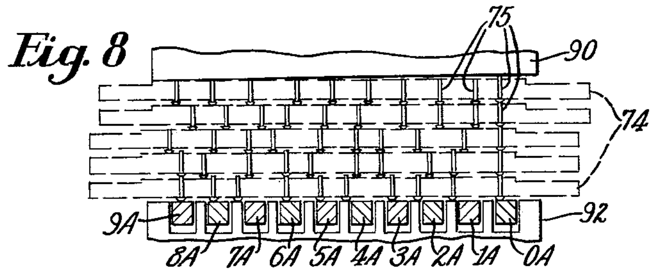
Figure 9:
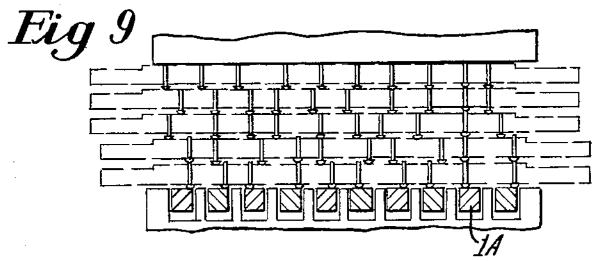
Figure 10:
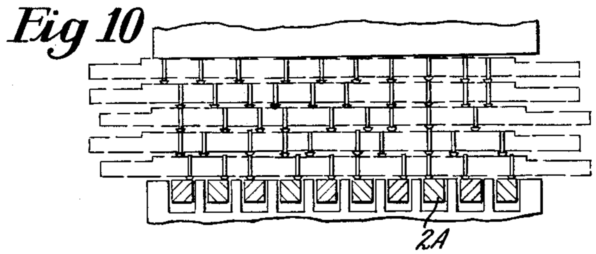
Figure 11:
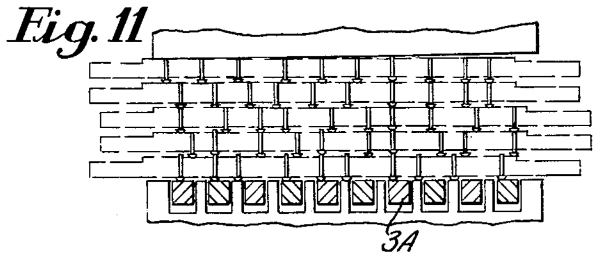
Figure 12:
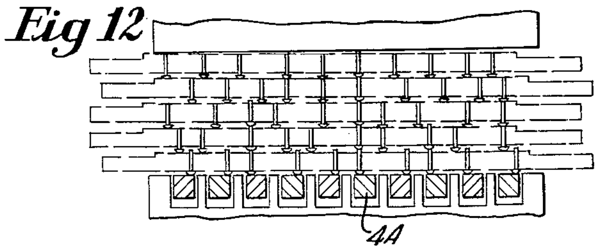
Figure 13:
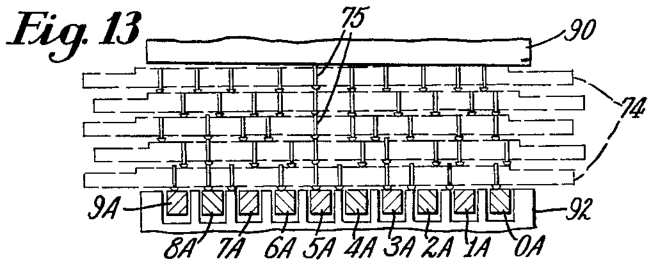
Figure 14:
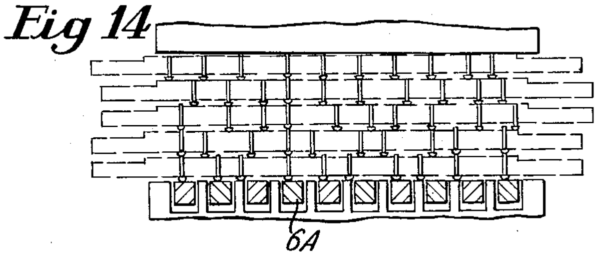
Figure 15:
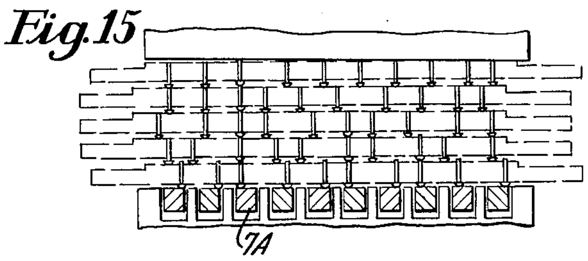
Figure 16:
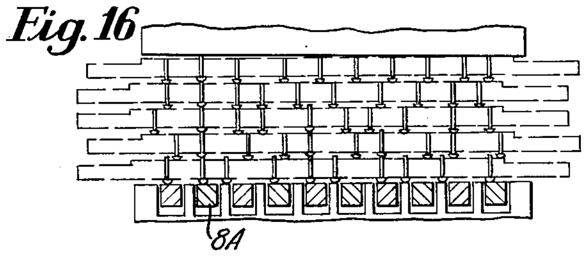
Figure 17:
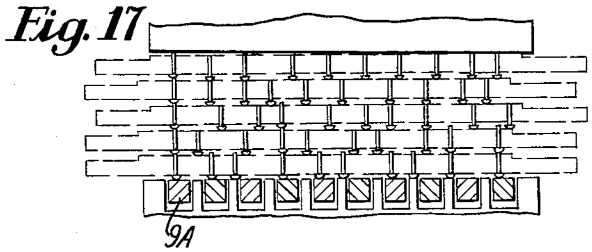
Figure 18:
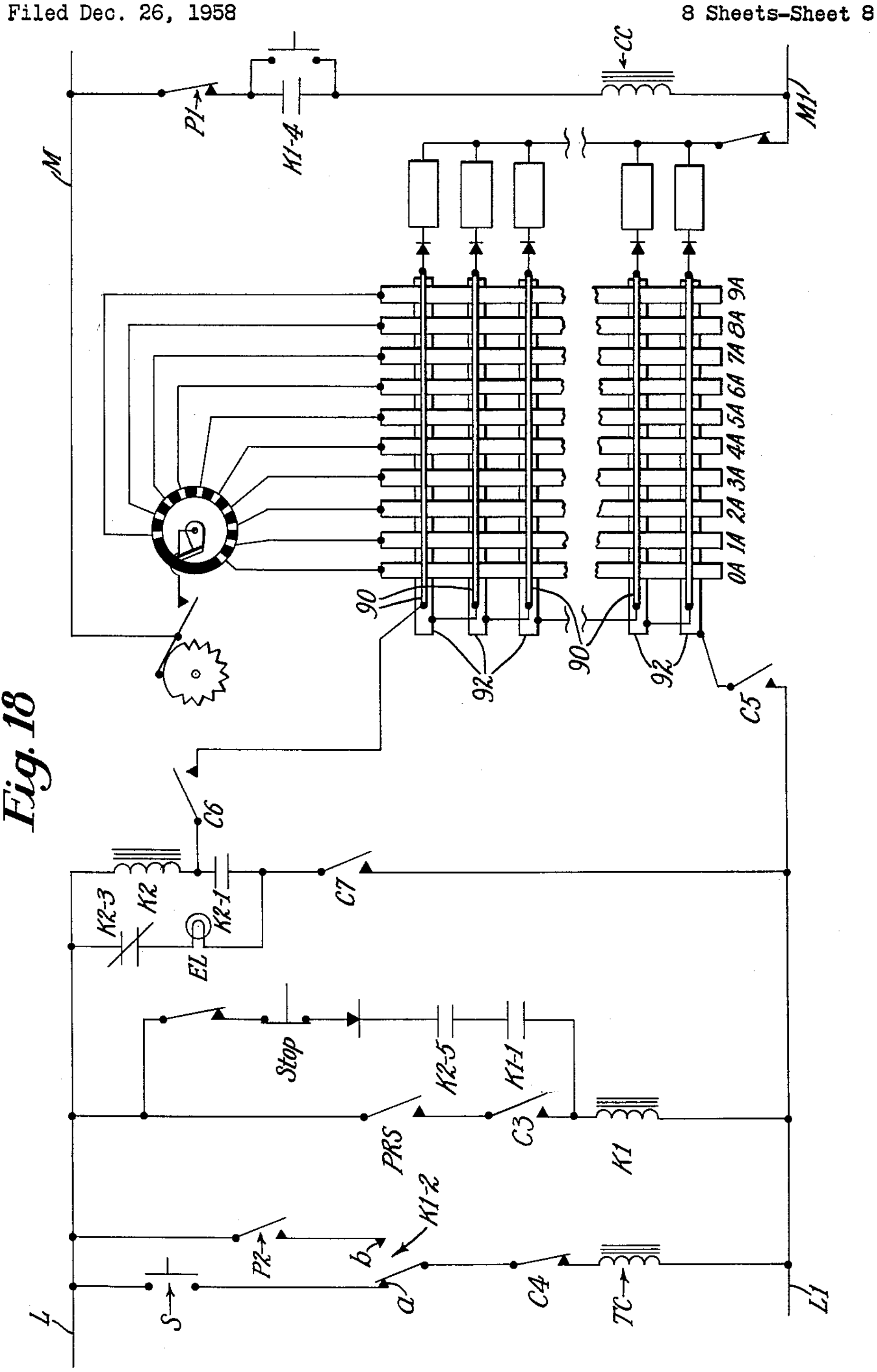

FIG. 3 diagrammatically illustrates the code used in the tag of FIG. 2;

FIG. 4 is a side elevation of the apparatus;

FIG. 5 is a plan view particularly showing the decoding mechanism;

FIG. 6 is a section on line VI—VI of FIG. 5;

FIG. 7 is an exploded perspective view of the mechanisms illustrated in FIG. 6;

FIGS. 8 through 17 diagrammatically illustrate the displaced positions of decoding slides corresponding to the digital values 0 through 9, respectively being decoded; and FIG. 18 is a schematic diagram of the control circuits utilized in the apparatus.

The invention will now be described by way of example in its application to the analyzing of perforated data sensed from a type of merchandise tag illustrated in FIG. 2. As therein illustrated, the tag is provided with a plurality of punched information index point positions arranged in columns each having five punching positions. The code used for recording data in the tag is a five element modified binary code having the bit or positional values of 1, 2, 4, 7 and check. The code, with corresponding digital values, is illustrated in FIG. 3. The tag is also provided with three locating and feed holes of relatively large diameter arranged in fixed positions relative to the data indicative perforations.

The tag reader for feeding and sensing the tags to be reproduced is illustrated in FIGS. 1 and 4. The tag feeding and sensing mechanisms utilized are generally similar to those illustrated in application for United States Letters Patent Serial No. 684,525, now Patent No. 2,973,142, filed September 17, 1957, in the name of R. K. Jenner, Jr., and reference may be had thereto if additional information is desired. It should be obvious that other means for sensing could be utilized without affecting the scope of the present invention.

As illustrated, perforated tags are moved one at a time from a magazine TM and thereafter fed by feed pins 20 along a table 22 to a pre-read station PR, a read station R and thereafter to a receiver TR. At the read station R the code perforations in each tag are sensed and the sensed information is decoded into corresponding digital values in a manner to be described.

For driving the tag feeding and sensing mechanisms the tag reader is provided with a motor (not shown) which, by means of a chain 24 (FIG. 1), drives a driving member of a clutch mechanism 25. The clutch mechanism is not illustrated in detail but may be of any suitable type adapted to provide one revolution for each actuation of the clutch. To actuate the clutch there is provided a clutch solenoid TC mounted on a side wall 26. The clutch is adapted upon energization of the solenoid to cause rotation of a cam shaft 28, the shaft being journaled at opposite ends, in suitable bearings in side walls 26 and 27. At opposite ends and outside the side walls, as seen in FIG. 1, the cam shaft has fixed thereto a pair of cams 29, the purpose of which will presently appear.

For sensing the presence of code holes in the columns of the tag at the read station, a sensing wire 30 (FIGS. 5 and 6) is provided for each possible code index position in the tag. In the present construction, provision is made for one-hundred and forty-five such wires at the read station. Each sensing wire operates within a tubular casing 32 which at its lower end is secured at the read station R in a manner fully disclosed in the above-mentioned application Serial No. 684,525, now Patent No. 2,973,142. The upper end of each casing 32 is received in spaced holes provided in two parallel plates 34 which are secured to two cross bars 36. The cross bars at opposite ends thereof are secured to blocks 38 fixed to the side walls 26 and 27, respectively. The upper end of each sensing wire 30 is fixed to a U-shaped tube 40 which is slidably mounted within a pair of plates 42 forming part of an oscillating unit 44. The plates 42 are secured to a pair of cross bars 46 which are fixed at opposite ends to a pair of slide blocks 48 (FIG. 5) by screws 50. The blocks 48 are fixed to forwardly extending slide rods 52 which slide in bores in the blocks 38 and in blocks 55 also carried by the side walls. The rods at their forward ends are provided with horizontal pins 56 which are received in slots 57 in the upper ends of arms 60 fixed to a shaft 61. The shaft 61 at opposite ends extends through the side walls and has fixed thereto a pair of arms 64. The arms 64 are connected by depending links 65 to cam levers 66 journaled outside the walls 26 and 27. The rear ends of the levers 66 carry rolls which ride on the cams 29. During initial rotation of the shaft 28 and cams 29 and through the above-described linkage, the arms 60 are swung clockwise, as seen in FIGS. 4 and 6, to move the oscillating unit 44 forward causing the sensing wires 30 to engage a tag at the read station.

The rearward end of each U-shaped tube 40 engages an associated slide 68, each of the slides being slidably supported in rectangular slots punched in plates 69 and 70, respectively. The plates 69, 70 are secured to two pairs of cross bars 72 which are fixed at opposite ends to the top and bottom of the slide blocks 48. Thus, the plates 69, 70 and the bars 72 also form a part of the oscillating unit 44. At its rearward end each of the slides 68 engages the forward end of a decoding slide 74 carried for sliding movement in two stationary plates 76 and 78. Each of the slides 74 is formed of a dielectrical material and is individually urged forward or to the right, as seen in FIG. 6, by a spring-pressed plunger 80, there being an individual plunger for each slide. Thus each plunger 80 acts through a decoding slide 74, a slide 68 and a U-shaped tube to urge a corresponding sensing wire 30 forwardly and downwardly through a tube 32 toward a corresponding code hole position in a tag at the read station R. Since there are five possible code hole positions in each column of the tag, there are also five decoding slides 74 for each column of the tag. Thus, for each column of information on the tag there is a corresponding group of five decoding slides 74 forming a decoding unit adapted to decode the code perforations sensed in that column.

Referring to FIG. 6, the decoding slides 74 are numbered CK, 1, 2, 4 and 7, respectively. This numbering is for the purpose of relating the slides to code hole positions having a corresponding position value in the tag code illustrated in FIG. 3. In its initial position, the oscillating unit 44 is held to the left of the position shown in FIG. 6 holding the U-shaped tubes 40 to the left by means of the forward plate 42, thus also holding the slides 68, 74 to the left against the action of their respective spring plungers 80 and maintaining the wires 30 retracted from the tag. As the oscillating unit 44 is moved forward during the sensing cycle of the machine, the forward plate 42 moves away from the ends of the U-shaped tubes 40 allowing the spring plungers 80 to urge the slides 68, 74 forwardly and hence also urge the sensing wires 30 down to probe the tag. Where a hole is present in the tag a sensing wire passes through the hole allowing its associated slide 74 to continue its movement. Where no hole exists, downward progress of the wire is halted by the tag holding the associated slide 74 in retracted position.

As seen in FIG. 6, the mechanism is shown in the positions assumed when the oscillating unit 44 has moved to its most forward position causing the sensing wires to probe for code holes in the tag. As illustrated, the sensing wires for the number 2 and the CK decoding slides have found holes in the corresponding column of the tag and these slides have advanced beyond the number 1, 4 and 7 slides. This combination of holes in the tag is indicative of the digit two. For other combinations of slides displaced indicating other digits, reference may be had to FIGS. 8 through 17.

Referring again to FIG. 6, it may be seen that each of the decoding slides 74 is provided with a plurality of vertical pins 75. Since the slides are formed from a dielectrical material all of the pins in a slide are electrically isolated from each other. The pins are differentially spaced in each slide and cooperate with the pins in adjacent slides in such manner that for each coded digit sensed in a tag resulting in a different combination of slides displaced, a different combination of pins will be axially alined forming a single complete electrical path through the decoder slides peculiar to each digit. For each valid combination of slides displaced only one path will be formed by the pins being axially alined in the manner generally disclosed in the above noted application Ser. No. 760,449.

Each group of slides forming a decoding unit has provided therefor an individual upper contact plate 90 and an individual lower comb-like connector plate 92. The plates 92 are electrically isolated from each other by insulating washers 94 or spacers 96, as best seen in FIG. 7. Each plate 92 is provided with lands 97 adapted to engage any combination of pins alined in the decoding slides when in the sensing position illustrated in FIG. 6. Each upper plate 90 is individually mounted and electrically isolated from adjacent plates by insulating combs 98, each plate being urged down against its associated pins 75 by a pair of spring-pressed plungers 100. Thus, for each column of information to be sensed in the tag, there is provided an individual decoding unit which includes an upper contact plate 90, decoding slides 74, pins 75, and a lower connector plate 92.

Each connector plate 92 is connected by a wire 102 to the upper contact plate 90 of an adjacent decoding unit, as best seen in FIG. 7. When all tag columns are sensed simultaneously, each decoding unit should have one set of decoding pins 75 alined forming an electrical path from its upper plate 90 through the pins 75 to its connector plate 92. Thus when the tag is properly sensed and decoded, a closed series circuit is formed through the alined pins in all decoding units. If any tag column is punched with a combination of holes not indicative of any digit from 0–9 then no combination of decoder pins will be alined in the corresponding decoding column. Thus, if such a recording error exists in any column of the tag, then the series circuit through all decoding units will be open. Thus, this series circuit can be used to check for malfunction of the decoding units and/or for code errors in the tag. If such an error is detected by an open circuit through the decoding units then the apparatus can be conditioned to stop its operation or to indicate the error in any suitable manner.

Referring to FIG. 18, the series testing circuit through the decoding units is arranged to control the operation of an error control relay coil K2 by means of a circuit which leads from a line wire L through the coil K2, a cam switch C6, through the decoding units via the plates 92, alined pins 75, and plates 90 of each unit and through a cam switch C5 to a line wire L1. As soon as the sensing wires have sensed the tag and the decoding slides 74 have been displaced to aline certain of the pins 75, the cam switches C5 and C6 which are controlled from the shaft 28 are closed to test the decoding units for a closed or open testing circuit. If the series testing circuit is closed, indicating no error, the relay coil K2 is energized to condition other control circuits, for causing the apparatus to analyze another record upon completion of the present cycle of operations. In the event of an error being indicated by an open testing circuit through the decoding units, the coil K2 will not be energized and such error detection will be visually indicated by lighting of an error lamp EL by a circuit from the line wire L, normally closed relay contacts K2–3 through the lamp and through a cam switch C7 to the line wire L1. Failure of the relay coil K2 to be energized also conditions other control circuits of the apparatus to prevent further automatic operation of the apparatus. In this manner the decoding units are tested during each cycle of operation for presence or absence of error and the analyzing apparatus is conditioned to operate in a manner consistent with the results of such test.

Associated with each group of sensing slides 68 there is provided a lock slide 104 (FIGS. 6 and 7) which is mounted for vertical sliding movements in a pair of horizontal plates 106 carried by the cross bars 72 forming part of the oscillating unit 44. Each lock slide is urged down by a spring plunger 108 into engagement with a bar 110 which extends across the machine under all lock slides. At opposite ends the bar 110 is carried by arms 112 fixed to a shaft 114 journaled in the side plates 26 and 27. The shaft 114 also has fixed thereto an arm 116 which is connected by a depending link 118 to a cam lever 120 (FIG. 4) having a roll riding on a cam 121 on the shaft 28 inside the side wall 27. Each lock slide 104 is provided with U-shaped openings 122 adapted to receive extrusions 124 projecting from each sensing slide 68. When the lock slides are in their raised position, as seen in FIG. 6, the extrusions are free to move in the lower portion of the openings 122. However, upon depression of the lock slides the extrusions are received in either the forward or rearward legs of the openings 122 to lock the sensing slides in their displaced positions, i.e., either forward or rearward. During the sensing cycle, the lock slides are held by the bar 110 in their upper positions, as seen in FIG. 6, allowing free movement of the sensing slides while the tag is sensed. However, as soon as the tag is sensed, the bar 110 is depressed as controlled by the cam 121 so that the spring plungers 108 move the lock slides 104 down to lock the sensing slides 68 in their displaced positions, i.e., either forward or retracted, as determined by the code holes sensed in the tag.

The oscillating unit 44 is then moved rearward as determined by the cams 29, thus also moving the lock slides bodily rearward. In this manner the sensing wires 30 are retracted from the tag at the read station R and the decoding slides 74 are moved bodily rearward while maintaining their relative displacement. During this movement of the decoding slides, the pins 75 of each decoding unit that were alined are moved out of engagement with the teeth of the connector plate 92 and into engagement with one of ten terminal bars 0A–9A. The terminal bars are utilized to control the operation of a secondary data processing device such as a reproducing card punch. The operation of such a device as controlled by a record analyzing apparatus is generally described in the above noted application Serial No. 760,449 and reference may be had thereto for further information.

The operation of the apparatus will now be described with particular reference to the electrical diagram illustrated in FIG. 18. For purposes of illustration and not by way of limitation, the apparatus will be described as controlling the operation of a card punch as a secondary device. To prepare the analyzing apparatus for operation, the operator loads a stack of record tags in the magazine TM and insures that the card punching apparatus also has a supply of blank cards to be punched, with information to be analyzed from the tags.

The control circuits of the tag reader are provided with two line wires L and L1 which are connected to a suitable source of electrical power. The card punching apparatus is provided with two line wires M and M1 which are connected to another suitable source of power. To initiate the operation of the tag reader, the operator closes the start switch S energizing the tag clutch solenoid TC by closing a circuit from the line wire L through the start switch through relay contacts K1–2*a* through a cam switch C4 which is closed at this time and through the solenoid TC to the line wire L1. In this manner, the tag reader clutch 25 is tripped commencing rotation of the cam shaft 28. Shortly thereafter, the cam switch C4, which is controlled from the shaft 28, opens, deenergizing the solenoid TC to reset the clutch tripping members for the next machine cycle. During rotation of the cam shaft, the wires 30 at the sensing station probe for data indications in the tags but since no tag is present no information is decoded and no decoding circuits are set up in the decoding units. During the sensing cycle a sensing wire at the pre-read station PR also probes for a tag and finding none allows a sensing switch PRS to remain open preventing energization of a control relay K1. After the sensing cycle a tag is fed from the tag magazine TM to an intermediate point preceding the pre-read station. The operator repeatedly closes the start switch S initiating successive cycles of the cam shaft until the first tag has been fed to the read station R.

The tag reader is then in condition for fully automatic operation which the operator may initiate by closing the start switch S. During the sensing portion of this cycle the sensing switch PRS is closed due to the presence of a tag at the pre-read station and the control relay K1 is energized, from the line wire L through switch PRS, a cam switch C3 and through relay coil K1 to the line wire L1. Energization of relay K1 transfers the switching arm of the contacts K1–2 from the *a* contact to the *b* contact disabling the starting circuit through the switch S. Relay contacts K1–1 are also closed at this time. The tag at the read station R is sensed causing the decoding slides 74 in each decoding unit to be displaced according to the code designations sensed from the tag causing a single decoding circuit to be closed in each decoding unit. During this initial displacement of the decoding slides the decoding pins 75 that are alined in each unit to form the single decoding circuit are also alined with an appropriate land of the connector plate 92 to form the series testing circuit previously described. This series testing circuit is closed only in the event a decoding circuit has been formed in each decoding unit.

One terminal of the series testing circuit through the decoder is connected through the cam switch C5 which is closed during the sensing cycle of the reader to the line wire L1. The other terminal of the series circuit is connected through the cam switch C6 which is also closed at this time and through the error control relay K2 to the line wire L. Thus assuming that a decoding circuit has been formed in each decoding unit the relay K2 will be energized, closing contacts K2–1 which by-pass the testing circuit through the decoding units by connection with the line wire L1 through a cam switch C7 which is also closed during this sensing cycle. Thus, during the remainder of the tag reading cycle when the decoding slides are locked and bodily moved to their control positions, the relay K2 remains energized even though the series testing circuit is opened. Energization of the relay K2 also opens normally closed contacts K2–3 to prevent lighting of the error lamp EL. Energization of relay K2 also closes contacts K2–5 completing a holding circuit for the relay K1 around the switches PRS and the cam switch C3. Thus, when the cam switch C3 opens, the relay K1 remains energized during the remainder of the tag reader cycle, and the switching arm of the contacts K1–2 remain on the *b* contacts.

When the relay K1 is energized, contacts K1–4 are also closed establishing a closed circuit from the line wire M through a cam switch P1 in the card punch apparatus through contacts K1–4 and through a card punch clutch solenoid CC to the line wire M1 commencing operation of the card punch apparatus.

When the decoding slides 74 are locked and moved bodily to their control positions, the decoding pins 75 are alined with one of the control terminal bars 0A–9A which control the operation of the card punch according to the data sensed from the tag. Near the end of the card punch cycle a cam switch P2 in the card punch is closed momentarily to energize the tag clutch solenoid TC by closing a circuit from the line wire L through the switch P2, the *b* contact of the relay contacts K1–2, through the cam switch C4 which closes near the end of the tag reader cycle and through the solenoid TC to the line wire L1. In this manner, the next tag reader cycle is automatically initiated to analyze the data recorded on another tag which has been fed to the read station R.

For illustration purposes assume that a code error has occurred in the tag being sensed or some malfunction has occurred in any one of the decoding units. In this event during the sensing cycle of the tag reader some one or more of the decoding units fail to form a decoding circuit therein. Thus the series testing circuit is open and the relay K2 is not energized. When the cam switch C7 closes during the sensing cycle, the error lamp EL is lit since the normally closed contacts K2–3 remain closed furnishing a visual indication to the operator that an error has occurred. The contacts K2–5 also remain open so that when the cam switch C3 opens the control relay K1 is deenergized causing the switching arm of the contacts K1–2 to transfer to the *a* contacts. Thus, the tag reader clutch solenoid TC is not energized at the end of the card punching cycle by closure of the cam switch P2 and the tag reader stops without analyzing another tag. Deenergization of the control relay K1 also causes the contacts K1–4 to open disabling the circuit to the clutch solenoid CC of the card punch causing the card punch also to come to a halt. Thus an error in the analyzing of a tag is clearly indicated to the operator both by lighting of the error lamp EL and by halting of the automatic operation of both the tag reader apparatus and the card punching apparatus.

During an error cycle of the tag reader, the tag in error is fed from the read station to the top of the stack of tags in the tag receiver TR so that the operator may remove the tag for manual handling at a subsequent time. After removing the error tag, the operator once again may initiate the operation of the tag reader by closing the start switch S.

Having thus described our invention, what we claim as new and desire to secure by Letters Patent of the United States is:

1. In a record analyzing apparatus having a plurality of decoding units each adapted to decode data coded on a record by formation of one of a plurality of possible decoding circuits corresponding to the value of properly coded data, means for electrically connecting all units in series through the one decoding circuit formed in each unit thereby forming a single testing circuit through all units and electric testing means responsive to said testing circuit for indicating the absence of a decoding circuit in each unit.

2. In a record analyzing apparatus having a plurality of decoding units each adapted to decode data coded on a record by formation of one of a plurality of possible decoding circuits corresponding to the value of properly coded data, means for electrically connecting all units in series through the one decoding circuit formed in each unit thereby forming a single testing circuit through all units, electric testing means responsive to said testing circuit being open for indicating the absence of a decoding circuit in each unit, and control means responsive to said testing circuit being closed for causing said apparatus to analyze another record.

3. In record analyzing apparatus having a plurality of decoding units, each including a plurality of switching slides displaceable according to code designations sensed from a record for forming one of a plurality of possible decoding circuits according to the displacement of said slides, means for electrically connecting all units in series through the one decoding circuit formed in each unit thereby forming a single testing circuit through all units, and electric testing means controlled by said testing circuit for indicating the presence and absence of at least one decoding circuit in each unit.

4. In record analyzing apparatus having a plurality of decoding units, each including a plurality of switching slides displaceable according to code designations sensed from a record for forming one of a plurality of possible decoding circuits according to the displacement of said slides, means effective upon displacement of said slides for electrically connecting all units in series through the one decoding circuit formed in each unit thereby forming a single tesitng circuit through all units, and electric testing means controlled by said testing circuit for indicating the presence and absence of at least one decoding circuit in each unit.

5. In record analyzing apparatus having a plurality of decoding units, each comprising a plurality of switching slides displaceable according to code designations sensed from a record for forming one of a plurality of possible decoding circuits according to the displacement of said slides, means effective upon displacement of said slides for connecting all units in series through the one decoding circuit formed in each unit thereby forming a single series circuit through all units, electric testing means controlled by said series circuit for indicating the presence and absence of a least one decoding circuit in each unit, a plurality of control terminals each corresponding to one of the possible circuits which can be formed in each unit, means for locking said slides against relative movement, and means for bodily moving said slides while so locked from positions cooperating with said connecting means to positions where each decoding circuit is closed with a corresponding terminal.

6. In a record analyzing device having a plurality of decoding units each comprising a plurality of slides displaceable according to data designations sensed from a record, a plurality of conductor pins carried by each slide and so arranged that displacement of the slides according to data designations sensed causes one pin in each slide to be alined with associated pins in cooperating slides thereby forming a closed electrical decoding circuit through said group of slides corresponding to the value of the data represented on said record, a connector plate in each unit having spaced lands engageable with the conductor pins forming one terminal of said circuit upon displacement of said slides, a second plate engaging the pin forming the other terminal of said circuit, the connector plate of each unit being connected to the second plate of an adjacent unit thereby forming a single series circuit connecting the decoding circuit formed in each unit in series with the circuits formed in adjacent units, and electric testing means controlled by the series circuit formed through all units for indicating the presence or absence of at least one decoding circuit in each unit.

7. In apparatus for analyzing records having data encoded therein in groups of code index positions, means for sensing said index positions for code designations, a plurality of decoding units, each associated with an individual group of code index positions, said units each comprising a plurality of slides individually displaceable according to the code designations sensed, and a plurality of switching means on each slide for forming one of a plurality of possible decoding circuits depending on the displacement of said slides in response to sensing of valid code designations, said switching means being ineffective to form a circuit upon sensing of invalid code designations, means effective upon displacement of said slides for electrically connecting all units in series through any decoding circuit formed in each unit, and a testing circuit including said connecting means and said decoding circuits for controlling error indication devices whereby failure to form a decoding circuit in any unit results in an error indication.

8. In apparatus for analyzing records having data encoded therein in groups of code index positions, means for sensing said index positions for code designations, a plurality of decoding units, each associated with an individual group of code index positions, said units each comprising a plurality of slides individually displaceable according to the code designations sensed, and a plurality of switching means on each slide for forming one of a plurality of possible decoding circuits depending on the displacement of said slides in response to sensing of valid code designations, said switching means being ineffective to form a circuit upon sensing of invalid code designations, means effective upon displacement of said slides for electrically connecting all units in series through any decoding circuit formed in each unit, and a testing circuit including said connecting means and said decoding circuits for controlling error indication devices whereby failure to form a decoding circuit in any unit results in an error indication, and a plurality of control terminals each corresponding to one of the possible circuits which can be formed in each unit, means for locking said slides against relative movement, and means for bodily moving said slides while so locked from positions cooperating with said connecting means to positions where each decoding circuit is closed with a corresponding terminal.

9. In a record analyzing device having a plurality of decoding units each comprising a plurality of slides displaceable according to data designations sensed from a record, a plurality of conductor pins carried by each slide and so arranged that displacement of the slides according to data designations sensed causes one pin in each slide to be alined with associated pins in cooperating slides thereby forming a closed electrical decoding circuit through said group of slides corresponding to the data represented on said record, a connector plate in each unit having spaced lands engageable with the conductor pins forming one terminal of said circuit upon displacement of said slides, a second plate engaging the pin forming the other terminal of said circuit, the connector plate of each unit being connected to the second plate of an adjacent unit thereby forming a single series circuit connecting the decoding circuit formed in each unit in series with the decoding circuits formed in adjacent units, and electric testing means controlled by the series circuit formed through all units for indicating the presence or absence of at least one decoding circuit in each unit, a plurality of control terminals each corresponding to one of the possible circuits which can be formed in each unit, means for locking said slides against relative movement, and means for bodily moving said slides while so locked from positions cooperating with said connecting means to positions where each decoding circuit is closed with a corresponding terminal.

10. In apparatus for analyzing records having data encoded therein in groups of code index positions, means for sensing the index positions of a record for code designations, a plurality of decoding units each adapted to decode the data encoded in an individual group of code index positions, said units each comprising a plurality of slides individually displaceable according to the code designations sensed and a plurality of switching means on each slide for forming one of a plurality of possible decoding circuits depending on the displacement of said slides, means effective upon displacement of said slides for electrically connecting all units in series through the decoding circuits formed in said units, a control circuit including in series said connecting means and said decoding circuits whereby said control circuit is closed upon formation of a decoding circuit in each decoding unit and whereby said control circuit is open upon nonformation of a decoding circuit in any decoding unit, and means operable upon closure of said control circuit for causing the apparatus to analyze another record.

References Cited in the file of this patent

UNITED STATES PATENTS

| | | |
|---|---|---|
| Re. 22,394 | Moore et al. | Nov. 23,1943 |
| 1,972,985 | Gardner | Sept. 11, 1934 |
| 2,460,702 | Mallery | Feb. 1, 1949 |
| 2,550,600 | Rehm | Apr. 24, 1951 |
| 2,757,866 | Johnson | Aug. 7, 1956 |
| 2,899,676 | Rivers et al. | Aug. 11, 1959 |